Oct. 21, 1930.  J. L. GONARD  1,778,799
DEVICE FOR PREVENTING RETROGRADE MOVEMENT OF VEHICLES
Filed May 29, 1928  2 Sheets-Sheet 2
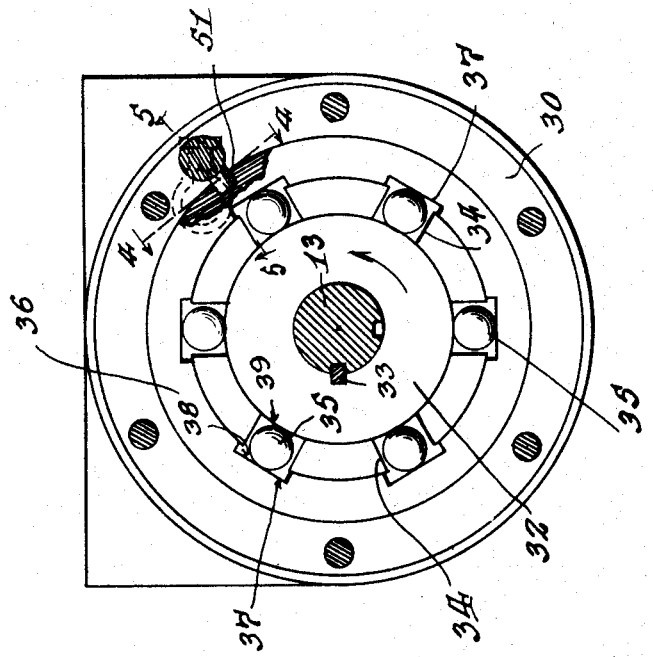
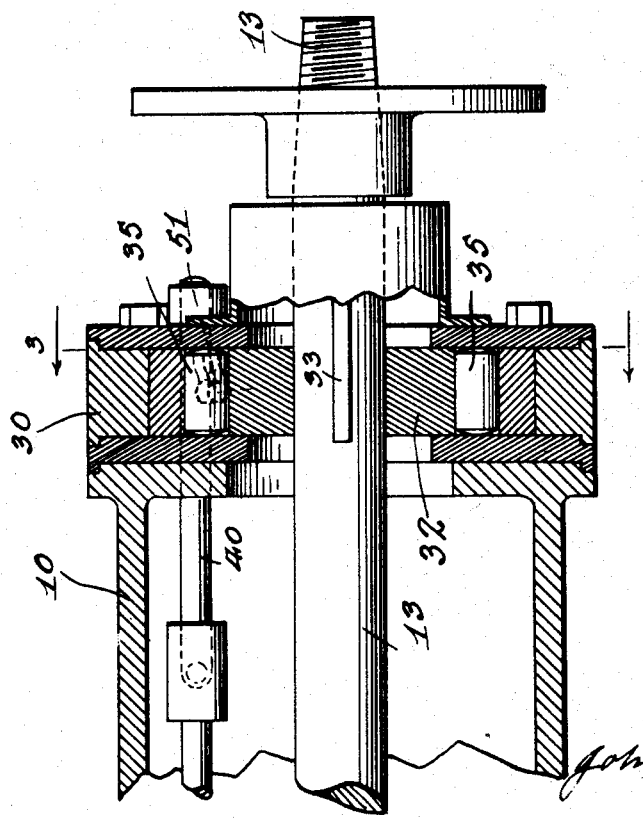
INVENTOR.
John L. Gonard Patented Oct. 21, 1930

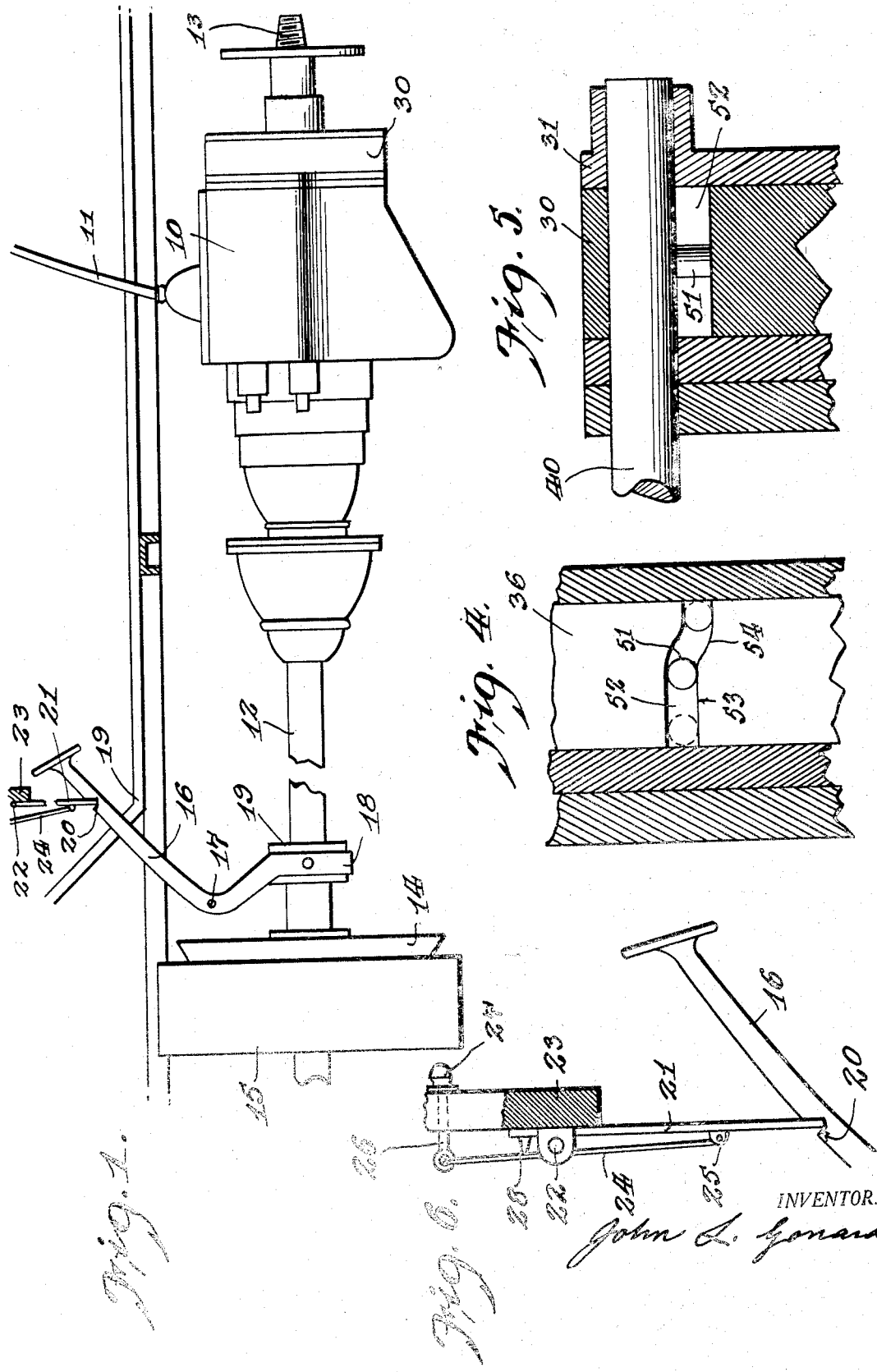

1,778,799

UNITED STATES PATENT OFFICE

JOHN L. GONARD, OF ENGLEWOOD CLIFFS, NEW JERSEY

DEVICE FOR PREVENTING RETROGRADE MOVEMENT OF VEHICLES

Application filed May 29, 1928. Serial No. 281,558.

This invention relates to a device for preventing retrograde movement of motor vehicles.

An object of the invention is the provision of a device which will automatically lock the running gear of an automobile to prevent backward movement of the automobile when the same has been stopped on an inclined roadbed.

A further object of the invention is the provision of a device which will prevent retrograde movement of an automobile while locking the driving elements connected with the rear wheels against reverse motion for permitting the automobile to be reversed under the power of an engine.

A further object of the invention is the provision of a device which will prevent retrograde movement of an automobile when said automobile is on an incline and when the clutch has been thrown out, but which will automatically release the locking means when the reversing gear has been thrown into operation, the clutching mechanism preventing retrograde movement of an automobile when the clutch and brake pedals have been released, so that the automobile may be readily started for forward movement without any danger of stalling the engine.

A still further object of the invention is the provision of a rockable means cooperating with friction elements for locking a drive shaft of a vehicle against reverse rotation with means connected to the shifting lever of the vehicle and movable transversely from the rockable means operatively connected therewith, for causing actuation of the rockable means to release the friction elements and permit rearward motion of the vehicle under its own power.

This invention will be best understood from a consideration of the following detailed description in connection with the accompanying drawings, nevertheless, it is to be understood that the invention is not confined to the disclosure, being susceptible of such changes and modifications as shall define no material departure from the salient features of the invention as expressed in the appended claims.

In the drawings:—

Figure 1 is a fragmentary longitudinal side view of a portion of the driving element of the automobile, showing my invention applied thereto, Figure 2 is a longitudinal vertical section of a device for preventing reverse rotation of the drive shaft, Figure 3 is a transverse section taken along the line 3—3 of Fig. 2, Figure 4 is a fragmentary vertical section taken along the line 4—4 of Fig. 3, Figure 5 is a section taken along the line 5—5 of Fig. 3, Figure 6 is a fragmentary view in elevation of the device for locking the clutch pedal in operative position for releasing the clutch members.

Referring more particularly to the drawings 10 designates the transmission casing provided with a gear shifting lever 11 which is of the usual type for shifting the gears in the transmission 10, and which is coupled with my improved device for preventing retrograde movement of a vehicle. An engine shaft 12 is connected by means of the transmission 10 with the drive shaft 13 of the vehicle. The movable clutch element 14 cooperates with a fixed clutch element 15 for connecting the shaft 12 with the engine shaft. The clutch pedal 16 hingedly mounted at 17, has a fork 18 engaging the ring 19 for actuating the movable clutch member 14 against the tension of the spring for causing the clutch member 14 to be moved out of engagement with the member 15. The clutch pedal, as shown in Fig. 1, extends through and above the floor board 19.

I have provided a device for locking the clutch pedal 16 in a predetermined position for maintaining the movable clutch element 14 out of engagement with the fixed clutch element 15 for a purpose which will be presently explained. For this purpose, I have provided a notch 20 in the pedal 16 which is adapted to be engaged by a swingable member 21 pivoted at 22 on the foot board 23 of the vehicle. A link 24 is pivotally connected to ears 25 secured to one face of the locking or hinged lever 21. An actuating member 26 is slidably mounted in the member 23 and is provided with a handle 27 adapted to be grasped for reciprocating the rod 26 and for actuating the link 24 and likewise the lever 21. A fulcrum 28 is secured to the member 23 and is engaged by the link 24 so that when the rod 26 is moved inwardly towards the driver's seat, the hinged lever 21 will be elevated out of engagement with the clutch 20 and the pedal 16, thereby releasing the pedal and permitting the usual spring (not shown) to force the movable clutch element 14 into engagement with the fixed clutch element 15.

The casing 30 is secured to the rear end of the transmission casing 10 and embraces the drive shaft 13. An end plate 31 closes the casing. A disc 32 is keyed at 33 to the drive shaft 13 and is provided with transverse pockets 34 at the periphery thereof to receive rollers or balls 35. These pockets having a greater width than the diameter of the rollers or balls will permit the limited movement of these friction elements.

A sleeve 36 embraces the rotatable member 32 and has a cut out portion 37 adjacent each pocket with the bottom of the cut out portion or recess being inclined at an angle to a tangent passing through a radius at this point. The inclined walls 38 of each pocket forms the outer end of the pocket 34. It will also be noted that the recesses 37 are wider than the width of the pockets 34 so that when the sleeve 36 is rocked in one direction, one end of the recess 37 will be moved nearer to the center of the pocket 34 and thereby restrict the space between the bottom 39 of a pocket 34 and the wall 38 of a recess 37, so that the friction element 35 will be jammed between the surfaces 38 and 39 and prevent reverse rotation of the member 32. When the sleeve 36 is rocked in the direction which is opposite to the previous direction of movement of the sleeve, the opposite end of the recess 37 will be moved nearer to the center of the pocket 34 and thereby provide a greater space between the surfaces 38 and 39 so that the friction elements 35 can not be jammed into braking relation with said surfaces and prevent rotation of the member 32 and likewise the shaft 13.

The rod 40 is slidably mounted in the transmission casing 10 and is connected with the shifting lever 11 so that with certain movements of the shifting lever, the rod 40 will be shifted for a purpose which will be presently explained. This rod is provided with a pin 51 projecting radially therefrom, and received within a cam groove 52. The portion of the groove indicated at 53 extends along a straight line and includes the greater portion of the groove. One end of the groove, as shown at 54 is offset. The straight portion 53 when engaged by the pin 52 moves the sleeve 36 to such position that a restriction between the surfaces 38 and 39 in the pockets 34 is provided for so that when the automobile is on an inclined road bed, and the vehicle tends to reversely operate the shaft 13, the friction elements 35 will be jammed in frictional relation between the members 32 and 36 and prevent retrograde motion of the vehicle. This condition of restraint upon the drive shaft in particularly for the beginner or for those who have difficulty in starting the vehicle on an upgrade when the engine has been stopped or has become stalled. In this case it is only necessary to operate the clutch pedal to shift the gears for low speed. When the clutch pedal is released the engine operates the drive shaft and likewise the rear wheels for moving the vehicle forwardly. No attention need be given to the brakes since the device automatically brakes the vehicle against retrograde movement.

The operation of my device is as follows: Whenever the shifting lever has been moved into position or into first, second, or third speeds, the pin 51 will be located in the portion 53 of the slot 52, whereby the sleeve 36 will be rocked to such a position that the space between the surfaces 38 and 39 of the pockets 34 will be at the greatest restriction so that if the vehicle to which the device has been applied is located upon an inclined surface, the friction elements 35 will be jammed between the surfaces 38 and 39 and thereby lock the rotatable member 32 to the sleeve 36 which has a relatively fixed position with respect to the rotatable member 32 and thereby prevent retrograde motion of the vehicle.

When it is desired to reverse the vehicle under its own power, it is necessary to employ some means to prevent the friction elements from acting as a brake to prevent retrograde motion of the drive shaft. A rod 40 is so coupled up with the shifting lever 11 that when said lever is moved to reverse position the pin 51 will be in the curved portion 54 of the slot 52 in the sleeve 36, whereby the sleeve will have been rocked to a position where the greatest space is provided between the surfaces 38 and 39 of the pockets 34, so that the friction elements 35 can not be jammed into frictional engagement between the inclined faces 38 and the curved faces 39 of the pockets 34. At this time it is possible to reverse the automobile under its own power.

Since the sleeve 36 will always be in position to prevent retrograde movement of the vehicle when the shifting lever is in either neutral, first, second, or third speeds, the vehicle can not be moved rearwardly manually without setting in motion the entire driving mechanism of the vehicle. In view of this, I have provided the pivoted lever or dog 21 which is adapted to engage the notch 20 in the clutch pedal 16 for retaining the clutch pedal in an inoperative position and for maintaining the clutch member 14 out of engagement with the clutch member 15. By this means the engine is disconnected from the drive shaft and it is possible to move the machine back rearwardly and manually without actuating the engine, which actuation normally tends to resist movement of the car due to the resistance of the cylinders when they are operating under compression.

I claim:—

1. A device for preventing retrograde movement of a vehicle comprising a rotatable member, a plurality of friction elements carried by the rotatable member, a rockable sleeve embracing the rotatable member and provided with surfaces for wedging the friction elements against the rotatable member when the rotatable member is revolved in one direction, said sleeve having a transverse cam groove, means for moving the sleeve for releasing the friction elements and including a reciprocating rod, a pin secured to the rod and located in the cam groove so that when the rod is reciprocated the sleeve will be rocked to release the friction elements.

2. A device for preventing retrograde movement of a vehicle comprising a rotatable member, a plurality of friction elements carried by the rotatable member, a rockable sleeve embracing the rotatable member and provided with surfaces for wedging the friction elements against the rotatable member when the rotatable member is revolved in one direction, a reciprocating means, cooperating means on the reciprocating means on the sleeve for rocking the sleeve and for releasing the friction elements.

3. A device for preventing retrograde movement of a vehicle comprising a rotatable member, a plurality of friction elements carried by the rotatable member, a rockable sleeve embracing the rotatable member and provided with surfaces for wedging the friction elements against the rotatable member when the rotatable member is revolved in one direction, means for rocking the sleeve and for moving the wedging surfaces of the sleeve to an inoperative position, and including a reciprocating means and cooperating means on the reciprocating means on the sleeve so that when the said reciprocating means is actuated the sleeve will be rocked.

4. A device for preventing retrograde movement of a vehicle comprising a rotatable member, a plurality of friction elements carried by the rotatable member, a rockable sleeve embracing the rotatable member and provided with surfaces for wedging the friction elements against the rotatable member when said member is revolved in one direction, said sleeve having a transverse groove, a reciprocating rod, a pin carried by the rod and received by the groove for retaining the sleeve against movement and for maintaining the surfaces of the sleeve in wedging action with the friction elements, said groove having an offset portion to receive the pin and rock the sleeve for moving the wedging surfaces in inoperative position.

5. A device for preventing retrograde movement of a vehicle comprising a rotatable member provided with pockets, friction elements free to move in the pockets, a sleeve embracing the rotatable member and having a surface adjacent each pocket for wedging a friction element in a pocket between the rotatable member and the surfaces of the sleeve, said sleeve having a transverse groove provided with an offset portion, a rod mounted for reciprocation and provided with a pin received by the groove and adapted to be shifted for rocking the sleeve when the pin is moved into the offset portion, while causing the wedging surfaces of the sleeve to be moved to an inoperative position.

6. A device for preventing retrograde movement of a vehicle comprising a rotatable member provided with pockets, friction elements free to move in the pockets, a sleeve embracing the rotatable member and having a surface adjacent each pocket for wedging a friction element in a pocket between the rotatable member and the surfaces of the sleeve, said sleeve having a transverse groove provided with an offset portion, a rod mounted for reciprocation and provided with a pin received by the groove and adapted to be shifted for rocking the sleeve when the pin is moved into the offset portion, while causing the wedging surfaces of the sleeve to be moved to an inoperative position, said pin and rod being adapted to normally maintain the sleeve against movement.

7. A device for preventing retrograde movement of a vehicle comprising a rotatable member provided with pockets, friction elements free to move in the pockets, a sleeve embracing the rotatable member and having a surface adjacent each pocket for wedging a friction element in a pocket between the rotatable member and the surfaces of the sleeve, said sleeve having a transverse groove provided with an offset portion, a rod mounted for reciprocation and provided with a pin received by the groove and adapted to be shifted for rocking the sleeve when the pin is moved into the offset portion, while causing the wedging surfaces of the sleeve to be moved to an inoperative position, when the pin is moved from the offset portion of the groove to the remaining portion, said sleeve is held against rocking movement and the wedging surfaces of said sleeve are placed in an operative position with respect to the friction elements.

8. A device for preventing retrograde movement of a vehicle comprising a transmission, a shifting lever operatively connected with the transmission, a rod rotatably mounted and operatively connected with the shifting lever, a rotatable member, a plurality of friction elements carried by the rotatable member, a rockable sleeve embracing the rotatable member and provided with surfaces which normally wedge the friction elements against the rotatable member when said member is revolved in one direction to prevent rotation of the member in that direction, said sleeve having a transverse cam groove, a pin connected with the reciprocating rod and received within the groove, so that when the rod is reciprocated by the shifting lever, the sleeve will be rocked in one position of the lever for moving the wedging surfaces in an inoperative position with respect to the friction elements.

9. In a vehicle, a shaft, means for revolving the shaft, a clutch connecting the revolving means with the shaft, a pedal for actuating the clutch to an inoperative position, and means for locking the pedal against movement when the pedal has moved the clutch to an inoperative position, and means for releasing the locking means.

10. In a vehicle, a shaft, means for revolving the shaft, a clutch connecting the revolving means with the shaft, a pedal for actuating the clutch to an inoperative position, means for locking the pedal against movement when the pedal has moved the clutch to an inoperative position, a rotatable member, a transmission for connecting the rotatable member with the shaft, a shifting lever, for the transmission, a braking means for normally preventing rotation of the rotatable member in one direction, means connected with the shifting lever for releasing the braking means when the shifting lever has been moved to a position where the driving means for the shaft will cause retrograde motion of the vehicle.

JOHN L. GONARD.